United States Patent
Shelke et al.

(10) Patent No.: US 11,522,763 B2
(45) Date of Patent: Dec. 6, 2022

(54) AGENT-BASED NETWORK SCANNING IN SOFTWARE-DEFINED NETWORKING (SDN) ENVIRONMENTS

(71) Applicant: NICIRA, INC., Palo Alto, CA (US)

(72) Inventors: Prashant Shelke, Pune (IN); Sharwari Phadnis, Pune (IN); Ganesh Avachare, Pune (IN); Neha Dhakate, Pune (IN); Kartiki Kale, Pune (IN); Yogesh Vhora, Pune (IN)

(73) Assignee: NICIRA, INC., Palo Alto, CA (US)

(*) Notice: Subject to any disclaimer, the term of this patent is extended or adjusted under 35 U.S.C. 154(b) by 168 days.

(21) Appl. No.: 15/898,235

(22) Filed: Feb. 16, 2018

(65) Prior Publication Data

US 2019/0166003 A1 May 30, 2019

(30) Foreign Application Priority Data

Nov. 29, 2017 (IN) .............................. 201741042815

(51) Int. Cl.
*H04L 41/12* (2022.01)
*H04L 41/08* (2022.01)
*H04L 41/00* (2022.01)
*H04L 41/046* (2022.01)
*H04L 45/64* (2022.01)
*H04L 61/50* (2022.01)
*H04L 43/00* (2022.01)
(Continued)

(52) U.S. Cl.
CPC ............ *H04L 41/12* (2013.01); *H04L 41/046* (2013.01); *H04L 41/08* (2013.01); *H04L 41/20* (2013.01); *H04L 43/14* (2013.01); *H04L 61/103* (2013.01); *H04L 45/64* (2013.01); *H04L 61/50* (2022.05); *H04L 2101/622* (2022.05)

(58) Field of Classification Search
CPC ......... H04L 41/12; H04L 41/08; H04L 61/20; H04L 41/046; H04L 43/14; H04L 41/20
See application file for complete search history.

(56) References Cited

U.S. PATENT DOCUMENTS

| | | | |
|---|---|---|---|
| 6,205,122 B1 * | 3/2001 | Sharon | H04L 41/12 370/254 |
| 8,844,041 B1 * | 9/2014 | Kienzle | H04L 45/02 726/25 |
| 10,320,750 B1 * | 6/2019 | Brandwine | H04L 63/1433 |

(Continued)

*Primary Examiner* — Chris Parry
*Assistant Examiner* — Steven C Nguyen
(74) *Attorney, Agent, or Firm* — Su IP Consulting

(57) ABSTRACT

Example methods are provided for a network scanning controller to perform agent-based network scanning in a software-defined networking (SDN) environment. In one example, the method may comprise identifying multiple networks for which network scanning is required, performing a first network scan using a first agent to obtain first address mapping information associated with multiple first workloads, and performing a second network scan using a second agent to obtain second address mapping information associated with multiple second workloads. The first agent and the multiple first workloads may be located in a first network, and the second agent and the multiple second workloads in a second network. The method may also comprise generating aggregated address information based on the first address mapping information and the second address mapping information.

18 Claims, 7 Drawing Sheets

(51) Int. Cl.
*H04L 61/103* (2022.01)
*H04L 101/622* (2022.01)

(56) References Cited

U.S. PATENT DOCUMENTS

| | | | |
|---|---|---|---|
| 2006/0159095 A1* | 7/2006 | Cook | H04L 45/04 370/392 |
| 2009/0016236 A1* | 1/2009 | Alcala | H04L 43/022 370/253 |
| 2010/0246443 A1* | 9/2010 | Cohn | G06F 9/5077 370/255 |
| 2013/0061047 A1* | 3/2013 | Sridharan | H04L 12/4666 713/162 |
| 2013/0250770 A1* | 9/2013 | Zou | H04L 41/12 370/238 |
| 2015/0058968 A1* | 2/2015 | Wang | H04L 63/0281 726/12 |
| 2016/0065385 A1* | 3/2016 | Hwang | G06F 9/45558 370/392 |
| 2017/0093640 A1* | 3/2017 | Subramanian | H04L 41/5058 |

* cited by examiner

First NMAP scan report 610

```
# nmap -v -sN 10.10.0.0/22

Nmap scan report for 10.10.0.181
Host is up (0.011s latency).
MAC Address: MAC1 (Vendor-1)
Nmap scan report for 10.10.0.183
Host is up (0.017s latency).
MAC Address: MAC3 (Vendor-1)
```

Second NMAP scan report 620

```
# nmap -v -sN 20.20.0.0/22

Nmap scan report for 20.20.0.212
Host is up (0.010s latency).
MAC Address: MAC2 (Vendor-2)
Nmap scan report for 20.20.0.215
Host is up (0.014s latency).
MAC Address: MAC5 (Vendor-2)
```

Third NMAP scan report 630

```
# nmap -v -sN 30.30.0.0/22

Nmap scan report for 30.30.0.4
Host is up (0.020s latency).
MAC Address: MAC4 (Vendor-3)
Nmap scan report for 30.30.0.6
Host is up (0.015s latency).
MAC Address: MAC6 (Vendor-1)
```

Fig. 6A

Aggregated address mapping information 550

| MAC Address | IP Address | |
|---|---|---|
| MAC1 | IP1 = 10.10.0.181 | 551 |
| MAC3 | IP3 = 10.10.0.183 | 552 |
| MAC2 | IP2 = 20.20.0.212 | 553 |
| MAC5 | IP5 = 20.20.0.215 | 554 |
| MAC4 | IP4 = 30.30.0.4 | 555 |
| MAC6 | IP6 = 30.30.0.6 | 556 |

QUERY(MAC5) 640
QUERY(MAC3) 650
QUERY(MAC4) 660

Fig. 6B

AGENT-BASED NETWORK SCANNING IN SOFTWARE-DEFINED NETWORKING (SDN) ENVIRONMENTS

RELATED APPLICATIONS

Benefit is claimed under 35 U.S.C. 119(a)-(d) to Foreign Application Serial No. 201741042815 filed in India entitled "AGENT-BASED NETWORK SCANNING IN SOFTWARE-DEFINED NETWORKING (SDN) ENVIRONMENTS", on Nov. 29, 2017, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtual workloads such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc.

Through SDN, benefits similar to server virtualization may be derived for networking services. For example, logical overlay networks that are decoupled from the underlying physical network infrastructure may be configured. Similar to a physical network, logical switches and logical routers may to provide respective layer-2 switching and layer-3 routing services to virtual machines. In practice, address information (e.g., hardware address information, network address information, etc.) associated with workloads in an SDN environment may be useful for various purposes, such as automated configuration, management, security assessment, etc. However, it may be challenging to retrieve the address information, especially when the workloads are deployed in different networks.

BRIEF DESCRIPTION OF DRAWINGS

FIG. 6A is a schematic diagram illustrating example address mapping information obtained by a network scanning controller in the example in FIG. 5;

FIG. 6B is a schematic diagram illustrating example aggregated address mapping information generated by a network scanning controller in the example in FIG. 5.

DETAILED DESCRIPTION

Figure 1:
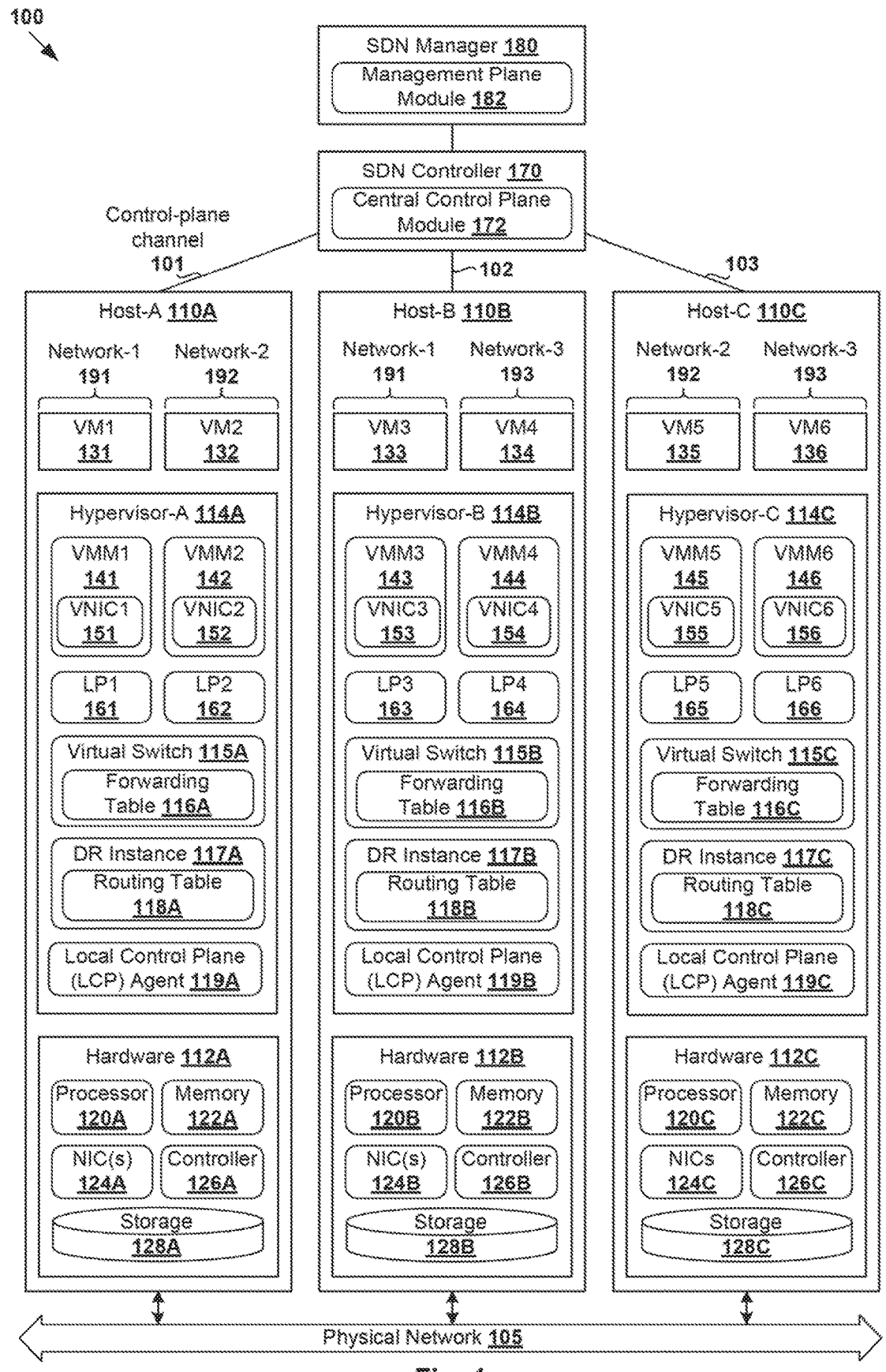
FIG. 1 is a schematic diagram illustrating an example Software-Defined Networking (SDN) environment in which agent-based network scanning may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Various challenges relating to address information retrieval will now be explained in more detail using FIG. 1, which is a schematic diagram illustrating example software-defined networking (SDN) environment 100 in which agent-based network scanning may be performed for a multi-node application. It should be understood that, depending on the desired implementation, virtualized computing environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Although examples of the present disclosure refer to virtual machines, it should be understood that a "virtual machine" running on a host is merely one example of a "virtualized computing instance" or "virtual workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. Example containers will be discussed further using FIG. 7. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 128A/128B/128C accessible via storage controller(s) 126A/126B/126C, etc. Virtual resources are allocated to each VM to support a guest operating system (OS) and applications. Corresponding to hardware 112A/112B/112C, the virtual resources may include virtual CPU, virtual memory, virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

Through software-defined networking (SDN), benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. Hypervisor 114A/114B/114C further implements virtual switch 115A/115B/115C and logical distributed router (DR) instance 117A/117B/117C to handle egress packets from, and ingress packets to, corresponding VMs 131-136 located on logical overlay network(s). In practice, logical forwarding elements such as logical switches and logical distributed routers may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. The term "packet" may refer generally to a group of bits that can be transported together from a source to a destination, such as message, segment, datagram, etc.

Further, logical distributed routers that provide logical layer-3 connectivity may be implemented collectively by DR instances 117A-C and represented internally using routing tables 118A-C at respective DR instances 117A-C. A logical router may be a distributed router (DR), service router (SR), etc. A DR represents a distributed routing component that is deployed to provide routing services for virtualized computing instances (e.g., VMs 131-136) to which the DR is connected. A DR may be implemented in a distributed manner in that it may span multiple hosts that support those virtualized computing instances. An SR represents a centralized routing component that is deployed to provide centralized stateful services, such as firewall protection, load balancing, network address translation (NAT), etc. As used herein, the term "layer-2" may refer generally to a hardware layer (e.g., Media Access Control (MAC) layer); and "layer-3" to a network layer (e.g., Internet Protocol (IP) layer) in the Open System Interconnection (OSI) model, although the concepts described herein may be used with other networking models.

Virtual switch 115A/115B/115C also maintains forwarding information to forward packets to and from corresponding VMs 131-136. Packets are received from, or sent to, each VM via an associated logical port. For example, logical ports 161-166 are associated with respective VMs 131-136. As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

In SDN environment 100, separate but integrated planes may be implemented, such as data plane, control plane (central control plane and local control plane) and management plane. For example, a data plane may be formed using hypervisors 114A-C supported by hosts 110A-C. SDN manager 180 and SDN controller 170 are network management entities that operate on a central control plane and a management plane, respectively. Network management entity 170/180 may be implemented using physical machine(s), virtual machine(s), or both. One example of an SDN controller is the NSX controller component of VMware NSX® (available from VMware, Inc.) that may be a member of a controller cluster (not shown) and configurable using SDN manager 180. One example of an SDN manager is the NSX manager component of VMware NSX® (available from VMware, Inc.) that provides an interface for end users to perform any suitable configuration in SDN environment 100.

SDN manager 180 and SDN controller 170 facilitate implementation of software-defined (e.g., logical overlay) networks in SDN environment 100. For example, SDN controller 170 is responsible for collecting and disseminating control information relating to logical overlay networks and overlay transport tunnels, such as logical network topology, membership information of logical overlay networks, mobility of the members, firewall rules and policies, etc. To send and receive the control information, each host 110A/110B/110C may implement local control plane (LCP) agent 119A/119B/119C to interact with central control plane module 172 on SDN controller 170. For example, control-plane channel 101/102/103 may be established between SDN controller 170 and host 110A/110B/110C using Transmission Control Protocol (TCP) over Secure Sockets Layer (SSL), etc.

In the example in FIG. 1, VMs 131-136 supported by hosts 110A-C may be deployed in different networks 191-193. In particular, VM1 131 and VM3 133 are located in first network-1 191 (e.g., 10.10.0.0/22), VM2 132 and VM5 135 in second network-2 192 (e.g., 20.20.0.0/22), and VM4 134 and VM6 136 in third network-3 193 (e.g., 30.30.0.0/22). In practice, networks 191-193 may be logical overlay networks that are formed using any suitable protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. To facilitate communication among members of a logical overlay network, hypervisor 114A/114B/114C implements a virtual tunnel endpoint (VTEP) to encapsulate egress packets from a source with an outer (tunnel) header identifying the logical overlay network. The VTEP performs decapsulation before virtual switch 115A/115B/115C forwards (decapsulated) packets to a destination.

In practice, it may be desirable to learn the address information of various components in SDN environment 100 for various purposes, such as management, configuration, etc. For example, a network administrator may wish to set up automated configuration or creation of a cluster of SDN managers 180 on the management plane, creation of a cluster of SDN controllers 170 on the central control plane, creation of a cluster of edge nodes, creation of transport nodes, logical switches for layer-2 or layer-3 connectivity, etc. In order to perform the automated configuration, the address information of components such as SDN manager 180, SDN controller 170, hypervisors 114A-C and VMs 131-136 are required.

Conventionally, network scanning may be performed to identify active nodes on a network. In practice, any suitable network scanning tool may be used, such as network port scanning using Network Mapper (NMAP), etc. In particular, NMAP is an open source network scanning utility that may be used for network exploration and security auditing. Network port scanning generally involves sending data packets via a particular network to specified port number(s) of a network node to identify the available network services on that network node. However, one main limitation of NMAP is that it is designed to assist users with scanning their own networks. For example, due to security reasons, a member of one network will not be able to retrieve the hardware address information of members of a remote, different network.

To circumvent the above problem associated with NMAP, one conventional approach may be to rely on management features supported by virtual infrastructure management platforms. For example, VMware vCenter Server™ (available from VMware, Inc.) is platform that facilitates centralized management of virtualized hosts and VMs in SDN environment 100. However, this approach may only be feasible for some hosts (e.g., ESX hosts) managed using the platform, and not for other hosts that use a different hardware virtualization technology (e.g., KVM hosts). In SDN environment 100 that may have tens or hundreds of hypervisors implementing various hardware virtualization technologies, it is challenging to obtain the hardware address information associated with workloads deployed in different networks.

Agent-Based Network Scanning

Figure 2:
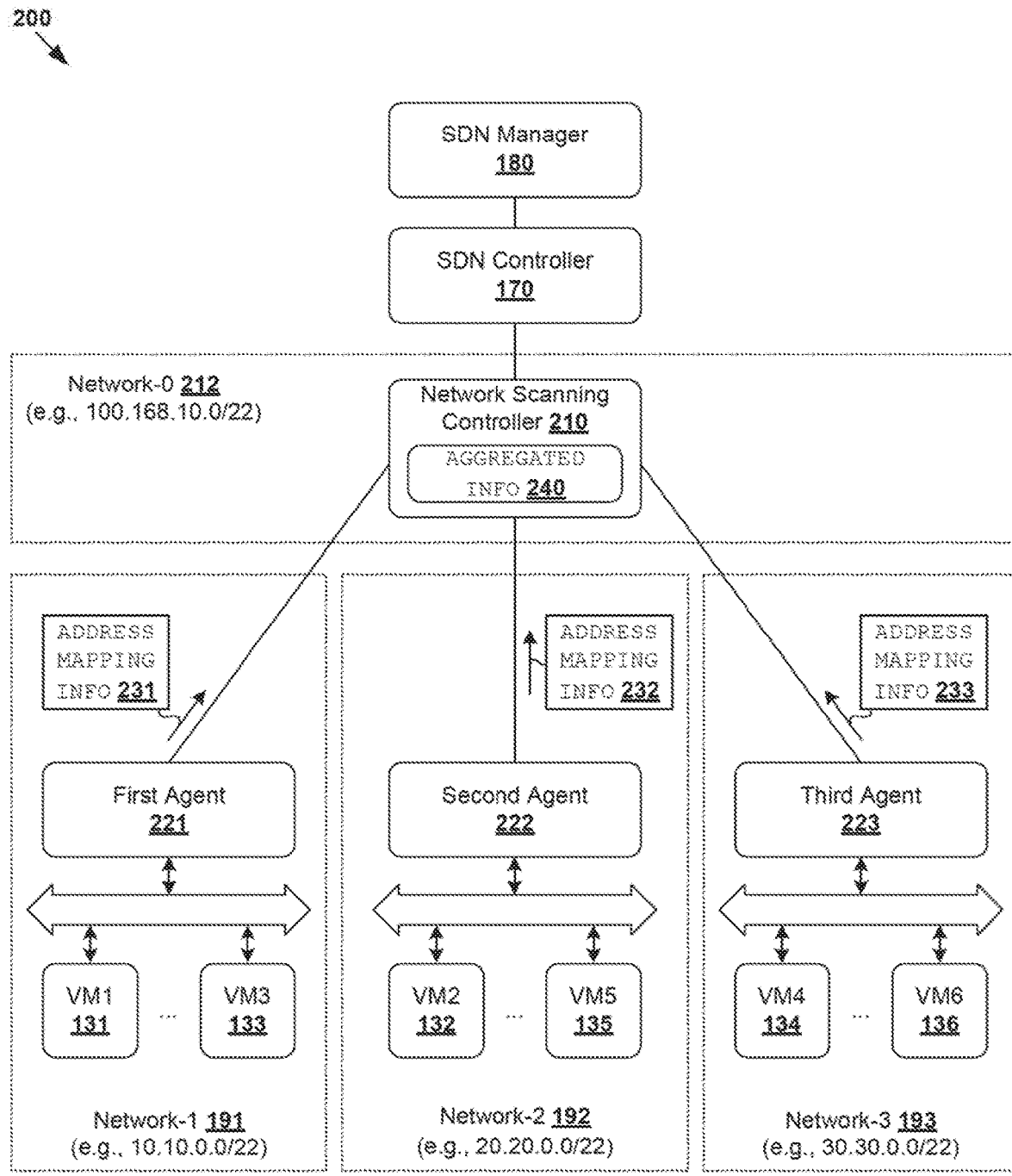
FIG. 2 is a schematic diagram illustrating an example agent-based network scanning in the SDN environment in FIG. 1.

According to examples of the present disclosure, network scanning may be performed in SDN environment 100 using an agent-based approach. For example, FIG. 2 is a schematic diagram illustrating example agent-based network scanning 200 in example SDN environment 100 in FIG. 1. Compared to the physical implementation view in FIG. 1, FIG. 2 also represents a management plane view of how various components (e.g., VMs 131-136) are represented internally. Depending on the desired implementation, SDN environment 100 may include additional and/or alternative component(s) than that shown in FIG. 1 and FIG. 2.

To facilitate network scanning, network scanning controller 210 and multiple agents 221-223 are deployed in SDN environment 100. FIG. 2 will be explained using FIG. 3, which is a flowchart of example process 300 to perform agent-based network scanning in SDN environment 100. Example process 300 may include one or more operations, functions, or actions illustrated by one or more blocks, such as 310 to 340. The various blocks may be combined into fewer blocks, divided into additional blocks, and/or eliminated depending on the desired implementation. In the following, network-1 191 will be used as an example "first network," network-2 192 as an example "second network," agents 221-222 and as example "first agent" and "second agent," VM1 131 and VM3 133 as example "first workloads," VM2 132 and VM5 135 as example "second workloads," etc.

Figure 3:
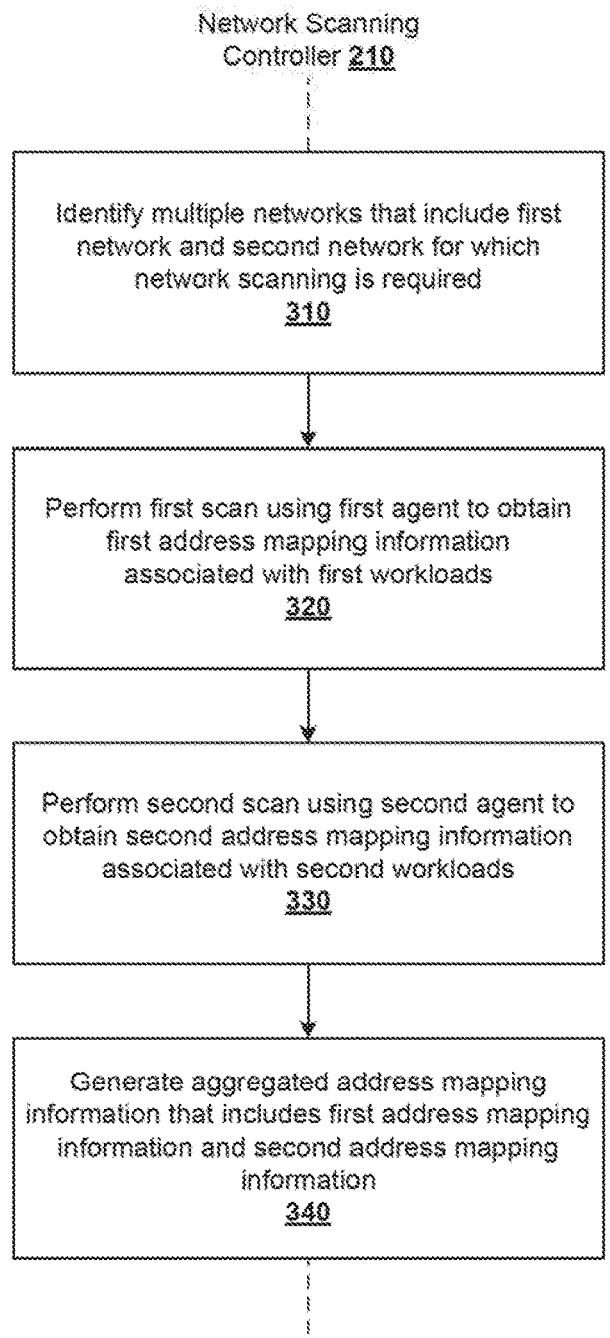
FIG. 3 is a flowchart of an example process for a network scanning controller to perform agent-based network scanning in an SDN environment.

At 310 in FIG. 3, network scanning controller 210 receives a request to perform network scanning in multiple networks that include first network 191 and second network 192. At 320, network scanning controller 210 performs a first network scan using first agent 221 to obtain first address mapping information associated with VM1 131 and VM3 133 (see 231 in FIG. 2). At 330, network scanning controller 210 performs a second network scan using second agent 222 to obtain second address mapping information associated with VM2 132 and VM5 135 (see 232 in FIG. 2). At 340, network scanning controller 210 generates aggregated address mapping information (see 240 in FIG. 2) that includes the first address mapping information and the second address mapping information.

As used herein, the term "network scanning controller" (e.g., NMAP controller) may refer generally to any suitable component that is capable of performing network scans using agents 221-223 deployed in respective networks 191-193 according to examples of the present disclosure. In practice, network scanning controller 210 may be a virtual entity, physical entity, etc. For example, network scanning controller 210 may be implemented using a virtualized computing instance supported by host 110A/110B/110D or any other host(s), a virtual/physical component of SDN controller 170, or a virtual/physical component of SDN manager 180, etc.

Similarly, agents 221-223 may each be a virtual entity, physical entity, etc. For example in FIG. 1 and FIG. 2, agents 221-223 may be virtualized computing instances supported by supported by host 110A/110B/110D or any other host(s). First agent 221, VM1 131 and VM3 are located in network-1 191, while second agent 222, VM2 132 and VM5 135 are located in network-2 192. Additionally in FIG. 2, third agent 223, VM4 134 and VM6 136 are located in network-2 192. In this case, network scanning controller 210 may perform a third network scan using third agent 223 to obtain third address mapping information (see 233 in FIG. 2) associated with VM4 134 and VM6 136 ("third workloads").

According to examples of the present disclosure, agents 221-223 may obtain address mapping information 231-233 in their respective networks 191-193. Network scanning controller 210 may generate aggregated address mapping information 240 based on address mapping information 231-233. Network scanning controller 210 may be deployed in any suitable network, such as network-0 (e.g., 100.168.10.0/22; see 212) in FIG. 2. As will be further described using FIG. 4 to FIG. 6B, "address mapping information" 231-233 may specify the mapping between one type of address information with another type of address information, such as hardware address information (e.g., MAC address) with network address information (e.g., IP address) associated with VMs 131-136.

Throughout the present disclosure, it should be understood that the term "workloads" (e.g., "first workloads" at 320 and "second workloads" at 330 in FIG. 3) may refer generally to virtual workloads (e.g., VMs 131-136) and/or physical workloads (also known as physical server, physical machine, host, etc.). For example in FIG. 2, a physical workload (not shown for simplicity) may be deployed in the same network 191 as first agent 221. In this case, network scanning controller 210 may perform the first network scan using first agent 221 to obtain address mapping information associated with the physical workload. Further, a "virtual workload" may be any suitable virtualized computing instance, such as a container running inside a VM, etc. Some examples will be discussed further using FIG. 7.

Detailed Example

Figure 4:
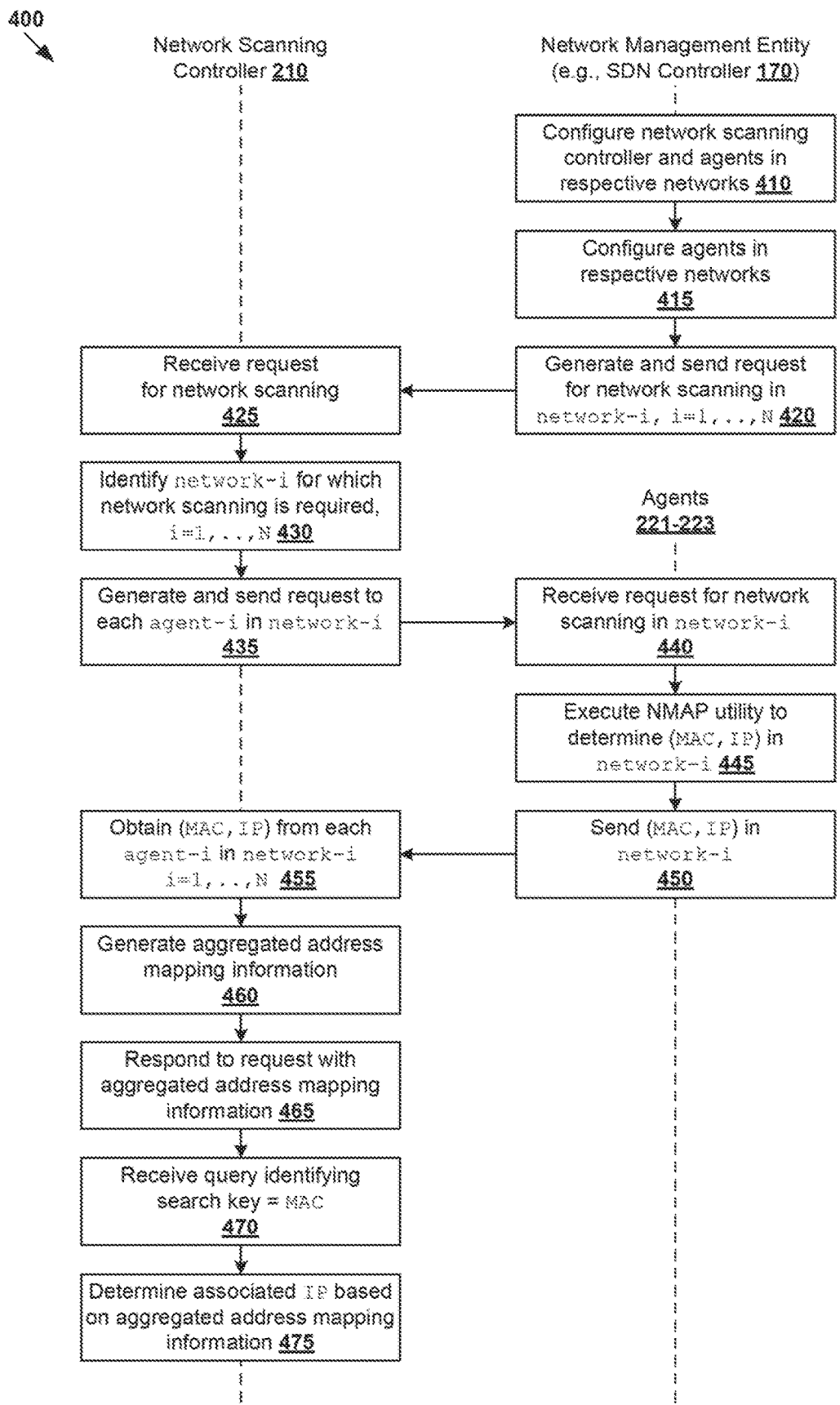
FIG. 4 is a flowchart of an example detailed process for agent-based network scanning in an SDN environment.
Figure 5:
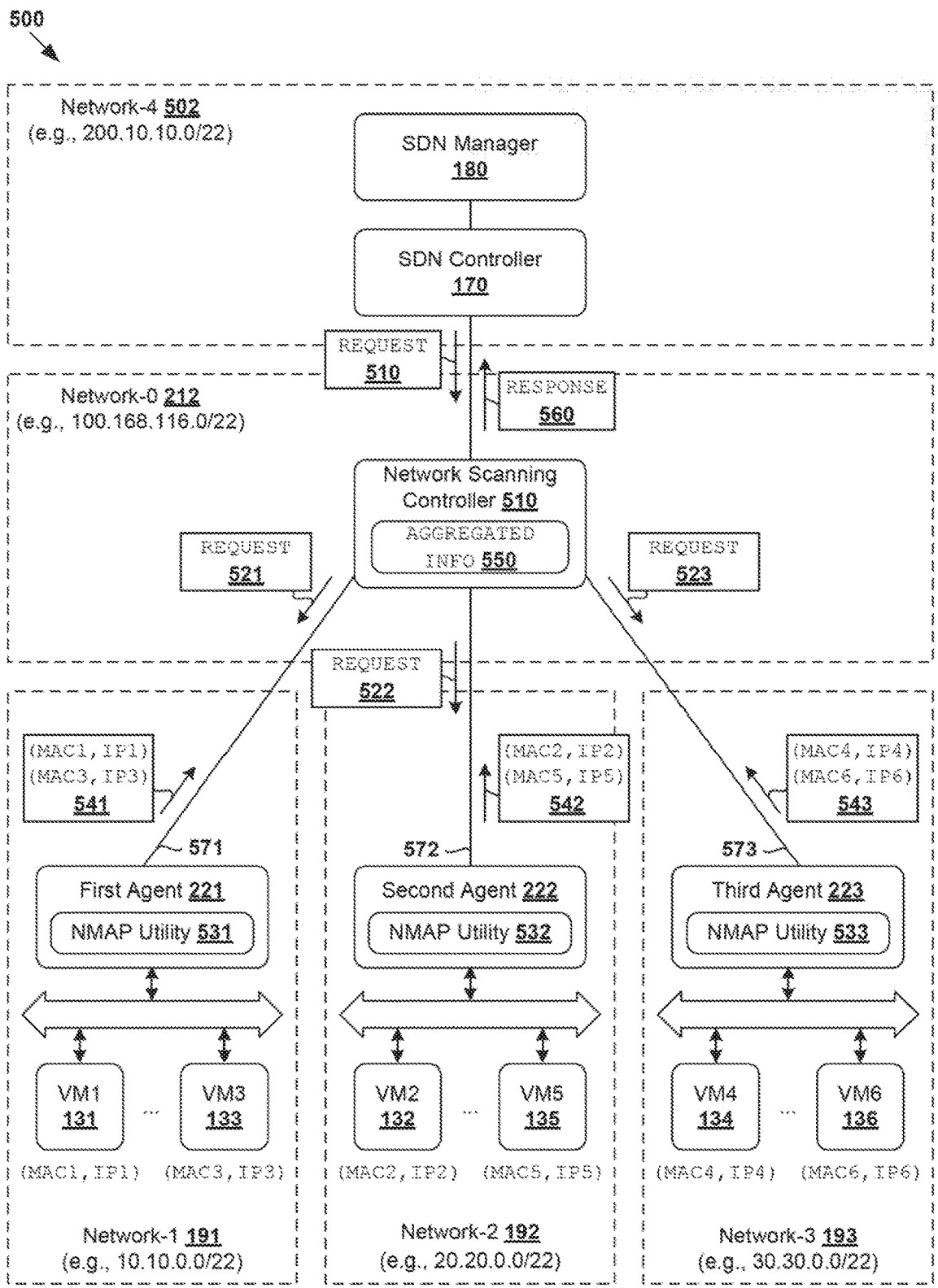
FIG. 5 is a schematic diagram illustrating a detailed example agent-based network scanning in an SDN environment according to the example in FIG. 4.

FIG. 4 is a flowchart of example detailed process 400 for agent-based network scanning in SDN environment 100. Example process 400 may include one or more operations, functions, or actions illustrated at 410 to 475. The various operations, functions or actions may be combined into fewer blocks, divided into additional blocks, and/or eliminated depending on the desired implementation. FIG. 5 is a schematic diagram illustrating example agent-based network scanning 500 in SDN environment 100 according to the example in FIG. 4.

At 410 and 415 in FIG. 4, SDN manager 180 and/or SDN controller 170 configures network scanning controller 210 and N agents in SDN environment 100. In the example in FIG. 5, consider a case of N=3 where network scanning controller 210 is deployed in network-0=100.168.10.0/22 (see 212), first agent 221 in network-1=10.10.0.0/22 (see 191), second agent 222 in network-2=20.10.0.0/22 (see 192) and third agent 223 in network-3=30.10.0.0/22 (see 193). It should be noted that SDN manager 180 and SDN controller 170 may be located in a different network, such as network-4=200.10.10.0/22 (see 212).

The configuration at blocks 410-415 may be initiated by a user (e.g., network administrator) via any suitable interface provided by SDN manager 180, such as application programming interface (API), graphical user interface (GUI), command line interface (CLI), etc. Based on the user's input configuration information, SDN manager 180 may instruct SDN controller 160 to deploy and/or configure network scanning controller 210 and agents 221-223. Alternatively or additionally, blocks 410-415 may be performed automatically (e.g., using a script, etc.).

In practice, network scanning controller 210 and agents 221-223 may be configured as virtualized computing instances (e.g., virtual machine, container, etc.), physical entities, a combination thereof, etc. Using the example in FIG. 2, network scanning controller 210 may be a VM (e.g., lightweight Linux machine) supported by host 110A/110B/110C or any other host. Similarly, agents 221-223 may be VMs (e.g., lightweight Linux machines) supported by host-A 110A, host-B 110B and host-C 110C respectively. In another example, multiple agents 221-223 may be deployed on one host (e.g., host-D, not shown for simplicity). In the example in FIG. 5, agents 221-223 are configured to have network scanning capability, such as by executing respective NMAP utilities 531-533, etc. Each agent may be configured with a scanner script that will scan all workloads located in the same network as the agent.

Any suitable tool may be used to configure network scanning controller 210 and agents 221-223. For example, Ansible (a trademark of Red Hat, Inc.) is a software that automates software provisioning, configuration management and deployment. A language called Ansible Playbook may be used to manage configurations of, and deployments to, remote machines by sending commands in a scripted manner. For example, to deploy a VM on host-A 110A (e.g., an ESXi host using .ova file extension), an "ovftool" utility in Ansible Playbook may be used. To deploy a VM on host-B 110B (e.g., a KVM host using .qcow2 or .img file extension), the "guestfish" and "virsh" utilities may be used.

At 420 in FIG. 4, SDN controller 170 requests network scanning controller 210 to perform network scanning in SDN environment 100. For example in FIG. 5, network scanning controller 210 receives request 510 to perform network scanning in network-i, where i=1, . . . , N and N=3. In practice, request 510 may identify all networks in which network scanning is required or a subset of the networks (e.g., network-1 191 and network-3 193), such as using an IP subnet address range, multiple IP subnet addresses, etc.

At 425 and 430 in FIG. 4, in response to receiving request 510 from SDN controller 170, network scanning controller 210 identifies network-i in which network scanning is required. At 435 and 455 in FIG. 4, network scanning controller 210 performs a network scan in network-i using agent-i to obtain address mapping information associated with VMs located in each network-i.

In the example in FIG. 5, block 435 may involve network scanning controller 210 generating and sending first request 521 to first agent 221 in network-1 191, second request 522 to second agent 222 in network-2 192 and third request 523 to third agent 223 in network-3 193. In practice, requests 521-523 may each represent a message, signal or instruction sent by network scanning controller 210, or an invocation of API(s) supported by agents 221-223, etc.

At 440 and 445 in FIG. 4, in response to receiving request 521/522/523, agent 221/222/223 determines address mapping information associated with workloads in network 191/192/193. At 450 in FIG. 4, agent 221/222/223 sends address mapping information 541/542/543 to network scanning controller 210.

Address mapping information 541/542/543 may be determined at block 445 using any suitable approach, such as by executing NMAP utility 531/532/533. Depending on the desired implementation, any suitable NMAP parameters may be used to specify scan techniques (e.g., '-sN'), port specification (e.g., '-p<port ranges>'), scan order (e.g., '-F' for fast mode), service/version detection (e.g., '-sV'), OS detection (e.g., '-O'), timing and performance (e.g., '-T<0-5>'), firewall evasion and spoofing (e.g., '-S<IP_Address>' to spoof source IP address), output options (e.g., '-v' to increase verbosity level), etc. The NMAP parameters may be configured by network scanning controller 210 and specified in requests 521-523. In practice, NMAP utility 531/532/533 may rely on characteristics of the TCP/IP stack implemented by VMs 131-136 and connection over Secure Shell (SSH) to perform network scanning. Any additional and/or alternative technique may be used to perform network scanning.

FIG. 6A is a schematic diagram illustrating example address mapping information obtained by network scanning controller 210 from agents 221-223 in the example in FIG. 5. At 610 in FIG. 6A, a first scan report generated by first agent 221 in network-1=10.10.0.0/22 using NMAP utility 531. First scan report 610 identifies (MAC1, IP1=10.10.0.181) associated with VM1 131 and (MAC3, IP3=10.10.0.182) associated with VM3 133. It should be noted that the phrase "Host is up" in first scan report 610 refers to VM1 131 or VM3 133, instead of the physical host supporting the virtual machine. Although "MAC1" and "MAC3" are shown in first scan report 610 in FIG. 6A for simplicity, it should be understood that a MAC address is generally a 48-bit address.

At 620 in FIG. 6A, a second scan report is generated by second agent 222 in network-2=20.20.0.0/22 using NMAP utility 532. Second scan report 620 identifies (MAC2, IP2=20.20.0.212) associated with VM2 132 and (MAC5, IP5=20.20.0.215) associated with VM5 135. Similarly, third scan report 630 is generated by third agent 223 in network-3=30.30.0.0/22 using NMAP utility 533. The third scan report identifies (MAC4, IP4=30.30.0.4) associated with VM4 134 and (MAC6, IP6=30.30.0.6) associated with VM6 136. Depending on the NMAP parameters used, scan reports 610-630 may include any other information, such as machine vendor information (e.g., "Vendor-1," "Vendor-2" and "Vendor-3" in FIG. 6A), completion time, etc.

At 455 and 460 in FIG. 4, network scanning controller 210 generates aggregated address mapping information 550 based on address mapping information 541-543 from respective agents 221-223. At 465 in FIG. 4, network scanning controller 210 responds to request 510 from SDN controller 170 by generating and sending response 560 specifying aggregated address mapping information 550. Address mapping information 541-543 and aggregated address mapping information 550 may be generated or stored in any suitable format, such as JavaScript Object Notation (JSON), eXtensible Markup Language (XML), etc.

In the example in FIG. 5, network scanning controller 210 learns (MAC1, IP1) and (MAC3, IP3) in first address mapping information 541 from first agent 221. Network scanning controller 210 also learns (MAC2, IP2) and (MAC5, IP5) in second address mapping information 542 from second agent 222, as well as (MAC4, IP4) and (MAC6, IP6) in third address mapping information 543 from third agent 223. Aggregated address mapping information 550 includes address mapping information 541-543 from different networks 191-193.

An example is shown in FIG. 6B, which is a schematic diagram illustrating example aggregated address mapping information 550 generated by network scanning controller 210 in the example in FIG. 5. In particular, aggregated address mapping information 550 includes (MAC1, IP1) associated with VM1 131 (see 551) and (MAC3, IP3) associated with VM3 133 (see 552) located in network-1=10.10.0.0/22, (MAC2, IP2) associated with VM2 132 (see 553) and (MAC5, IP5) associated with VM5 135 (see 554) located in network-2=20.20.0.0/22; and (MAC4, IP4) associated with VM4 134 (see 555) and (MACE, IP6) associated with VM6 136 (see 556) located in network-3=30.30.0.0/22.

As such, according to examples of the present disclosure, an agent-based approach may be implemented to help eliminate the limitation of NMAP utility of not gathering MAC address information of available hosts (e.g., VMs 131-136) in different remote networks 191-193 due to security reasons. Thus, retrieving IP address information of workload VMs running on remote KVM hosts or any host is possible even in the absence of vCenter API or any software-defined data center (SDDC) management platform.

To facilitate secure transfer of address mapping information 541-543 and aggregated address mapping information 550, an authentication mechanism may be implemented to establish secure channels between network scanning controller 210 and respective agents 221-223, as well as between network scanning controller 210 and SDN controller 170. For example in FIG. 5, a certificate-based authentication mechanism may be implemented over secure channels 571-573 to address security vulnerability and reduce the likelihood of a malicious attack (e.g., man-in-the-middle attack) by a third party. In particular, network scanning controller 210 may receive first address mapping information 541 via a first secure channel (see 571) established with first agent 221, second address mapping information 542 via a second secure channel (see 572) established with second agent 222, and third address mapping information 543 via a third secure channel (see 573) established with third agent 223.

In practice, aggregated address mapping information 550 may be used for any suitable purposes, such as automated configuration, management, etc. In one example, automation tools or scripts may be configured to retrieve IP address information of any remote VMs 131-136 based on aggregated address mapping information 550. For example, IP address information is generally susceptible to changes, the MAC address information may be used as a "search key" or "query key" to retrieve the associated IP address information. In this case, according to blocks 470 and 475 in FIG. 4, in response to receiving a query identifying hardware address information of a particular virtual machine, network address information associated with the particular VM is determined based on aggregated address mapping information 550.

Referring to the example in FIG. 6B, at 640, in response to receiving a first query for MAC5, network scanning controller 210 or SDN controller 170 may generate and send a response identifying IP5 associated with MAC5. At 650, in response to receiving a second query for MAC3, a response identifying IP3 associated with MAC3 may be generated and sent. At 660, in response to receiving a third query for MAC4, a response identifying IP4 associated with MAC4 may be generated and sent. If the IP address information of VM4 134 is updated from IP4=30.30.0.4 to IP7=30.30.0.400 at another point in time, a subsequent query for MAC4 will return a response identifying the latest IP7. Although MAC address information has been used as an example search key, it should be appreciated that any other unique identifier(s) may be used. In practice, blocks 470-475 may be performed by SDN controller 170 and/or any other suitable entity in SDN environment 100.

According to examples of the present disclosure, aggregated address mapping information 550 may be used to simplify network automation workflows, such as layer-2 and/or layer-3 connectivity between VMs 131-136 in different networks 191-193. Further, various validation and/or verification operations may be performed based on aggregated address mapping information 550, such as verification of mesh ping operations among VMs 131-136 connected over logical overlay networks, validation and verification of networking capabilities (e.g., logical switching, logical routing, Dynamic Host Configuration Protocol (DHCP), routing, virtual private network (VPN), firewall, etc.). Similarly, IP address information required for these operations may be retrieved based on MAC address information according to the example in FIG. 4. In practice, these operations may be performed using SDN manager 180 (e.g., initiated by a user through GUI/API) or SDN controller 170, and/or any other suitable entity in SDN environment 100.

Container Implementation

Although explained using VMs 131-136, it should be understood that "first workloads" and "second workloads" in the example in FIG. 2 may include other virtualized computing instances (such as containers) and/or physical workloads. In this case, network scanning controller 210 may obtain address mapping information associated with physical workload(s), container(s), VM(s), or a combination thereof. Some examples will be described using FIG. 7, which is a schematic diagram illustrating example agent-based network scanning 700 in an SDN environment with physical workloads and containers.

Figure 7:
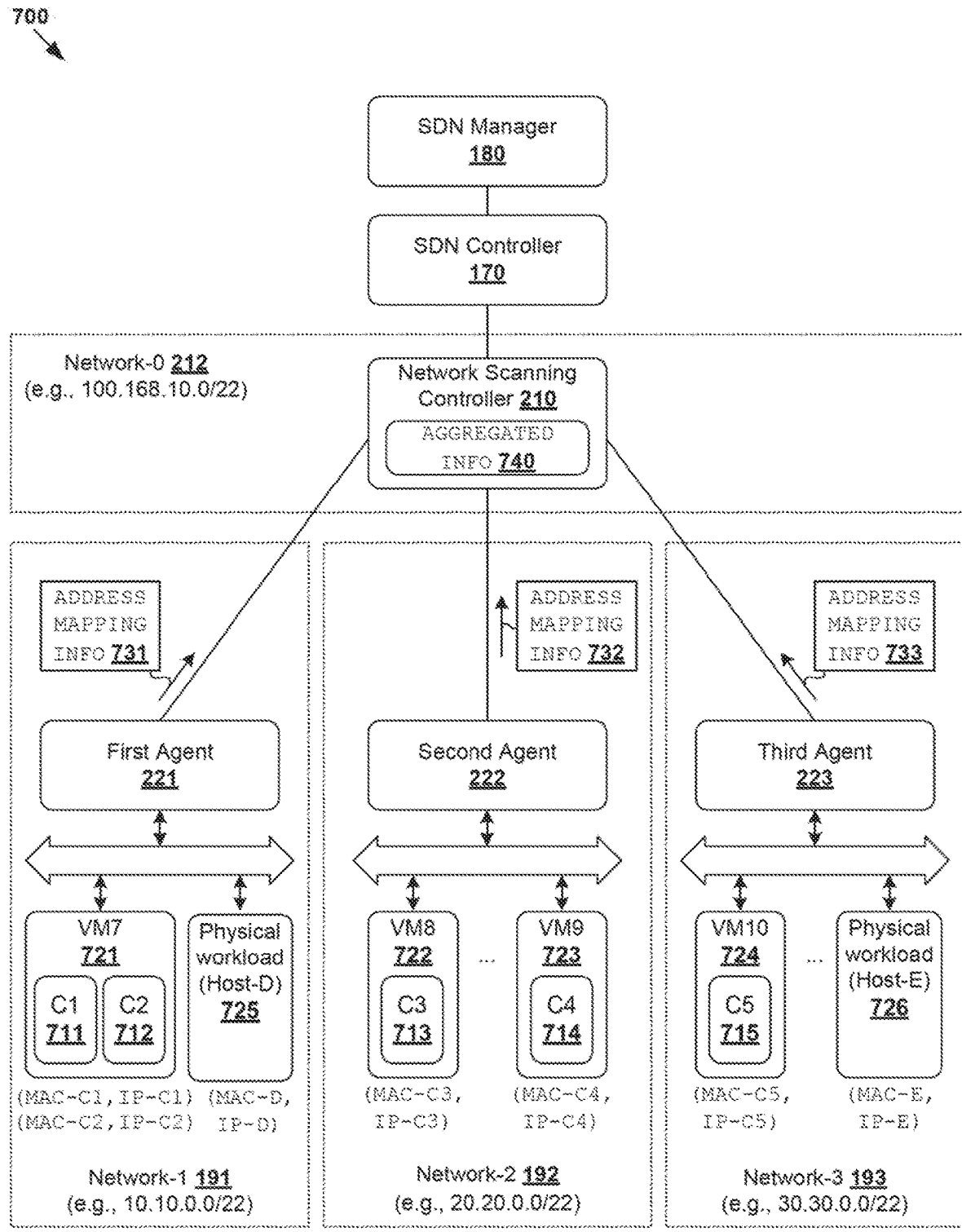
FIG. 7 is a schematic diagram illustrating example agent-based network scanning in an SDN environment with containers.

In the example in FIG. 7, container technologies may be used to run various containers 711-715 inside respective VMs 721-724. As used herein, the term "container" (also known as "container instance") is used generally to describe an application that is encapsulated with all its dependencies (e.g., binaries, libraries, etc.). For example, containers C1 711 and C2 712 may be executed as isolated processes inside VM7 721. Similarly, C3 713 and C4 714 may be executed as isolated processes inside respective VM8 722 and VM9 723, and C5 715 inside VM10 724. Containers 711-715 are "OS-less", meaning that they do not include any OS that could weigh 10s of Gigabytes (GB). This makes containers 711-715 more lightweight, portable, efficient and suitable for delivery into an isolated OS environment. Running containers inside a VM (known as "containers-on-virtual-machine" approach) not only leverages the benefits of container technologies but also that of virtualization technologies. Further in FIG. 7, physical workloads such as host-D 725 and host-E 726 are located in network-1 191 and network-3 193, respectively.

Similar to the examples in FIG. 1 to FIG. 6, network scanning controller 210 may perform network scanning in network-1=10.10.0.0/22 using first agent 221 to obtain first address mapping information 731 that includes (MAC-C1, IP-C1) associated with C1 711, (MAC-C2, IP-C2) associated with C2 712 and (MAC-D, IP-D) associated with first physical workload 725. Also, network scanning controller 210 may perform network scanning in network-2=20.20.0.0/22 using second agent 222 to obtain second address mapping information 731 that includes (MAC-C3, IP-C3) associated with C3 713 and (MAC-C4, IP-C4) associated with C4 714. Further, network scanning controller 210 may perform network scanning in network-3=30.30.0.0/22 using third agent 223 to obtain third address mapping information 731 that includes (MAC-05, IP-05) associated with C5 715 and (MAC-E, IP-E) associated with second physical workload 726. Similar to the example in FIG. 6B, network scanning controller 210 may generate aggregated address mapping information 740 based on address mapping information 731-733.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 7. For example, computer system(s) capable of supporting network scanning controller 210 and/or agents 221-223 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a network scanning controller to perform agent-based network scanning in a software-defined networking (SDN) environment that includes the network scanning controller, a first agent and a second agent, wherein the method comprises:

identifying multiple networks, by and at the network scanning controller, for which network scanning is required, wherein the multiple networks include a first network and a second network, wherein the first network is a first logical overlay network, the second network is a second logical overlay network, and the first network and the second network are different;

generating and sending, by and at the network scanning controller, a first request to the first agent to cause the first agent to execute a first network mapper (NMAP) utility to obtain first address mapping information associated with multiple first workloads, wherein the first agent, the multiple first workloads, and the first NMAP utility are located in the first network;

generating and sending, by and at the network scanning controller, a second request to the second agent to cause the second agent to execute a second NMAP utility to obtain second address mapping information associated with multiple second workloads, wherein the second agent, the multiple second workloads, and the second NMAP utility are located in the second network; and aggregating, by and at the network scanning controller, the first address mapping information associated with the first network and the second address mapping information associated with the second network to generate aggregated address mapping information.

2. The method of claim 1, wherein the method further comprises:

receiving, from the first agent, the first address mapping information specifying hardware address information and network address information associated with each of the multiple first workloads; and receiving, from the second agent, the second address mapping information specifying hardware address information and network address information associated with each of the multiple second workloads.

3. The method of claim 1, wherein the method further comprises:

prior to executing the first NMAP utility and the executing the second NMAP utility, receiving a request from a network management entity to perform network scanning in the multiple networks; and generating and sending a response to the network management entity, wherein the response includes the aggregated address mapping information.

4. The method of claim 1, wherein the method further comprises:

receiving a query identifying hardware address information of a particular workload; and based on the aggregated address mapping information, determining network address information associated with the particular workload, wherein the particular workload is one of the multiple first workloads or the multiple second workloads.

5. The method of claim 1, wherein the first logical overlay network connects the first agent with the multiple first workloads that include first virtualized computing instances; and the second logical overlay network connects the second agent with the second workloads that include multiple second virtualized computing instances.

6. The method of claim 1, wherein performing the first network scan and the second network scan comprises:

receiving the first address mapping information via a first secure channel established between the network scanning controller and the first agent; and receiving the second address mapping information via a second secure channel established between the network scanning controller and the second agent.

7. A non-transitory computer-readable storage medium that includes a set of instructions which, in response to execution by a processor of a computer system, cause the processor to perform a method of agent-based network scanning in a software-defined networking (SDN) environment that includes the computer system, a first agent and a second agent, wherein the method comprises:

identifying multiple networks, by and at the network scanning controller, for which network scanning is required, wherein the multiple networks include a first network and a second network, wherein the first network is a first logical overlay network, the second network is a second logical overlay network, and the first network and the second network are different;

generating and sending, by and at the network scanning controller, a first request to the first agent to cause the first agent to execute a first network mapper (NMAP) utility to obtain first address mapping information associated with multiple first workloads, wherein the first agent, the multiple first workloads, and the first NMAP utility are located in the first network;

generating and sending, by and at the network scanning controller, a second request to the second agent to cause the second agent to execute a second NMAP utility to obtain second address mapping information associated with multiple second workloads, wherein the second agent, the multiple second workloads, and the second NMAP utility are located in the second network; and aggregating, by and at the network scanning controller, the first address mapping information associated with the first network and the second address mapping information associated with the second network to generate aggregated address mapping information.

8. The non-transitory computer-readable storage medium of claim 7, wherein the method further comprises:

receiving, from the first agent, the first address mapping information specifying hardware address information and network address information associated with each of the multiple first workloads; and receiving, from the second agent, the second address mapping information specifying hardware address information and network address information associated with each of the multiple second workloads.

9. The non-transitory computer-readable storage medium of claim 7, wherein the method further comprises:

prior to executing the first NMAP utility and the executing the second NMAP utility, receiving a request from a network management entity to perform network scanning in the multiple networks; and generating and sending a response to the network management entity, wherein the response includes the aggregated address mapping information.

10. The non-transitory computer-readable storage medium of claim 7, wherein the method further comprises:

receiving a query identifying hardware address information of a particular workload; and based on the aggregated address mapping information, determining network address information associated with the particular workload, wherein the particular workload is one of the multiple first workloads or the multiple second workloads.

11. The non-transitory computer-readable storage medium of claim 7, wherein the first logical overlay network that connects the first agent with the multiple first workloads that include first virtualized computing instances; and the second logical overlay network connects the second agent with the multiple second workloads that include second virtualized computing instances.

12. The non-transitory computer-readable storage medium of claim 7, wherein performing the first network scan and the second network scan comprises:

receiving the first address mapping information via a first secure channel established with the first agent; and receiving the second address mapping information via a second secure channel established with the second agent.

13. A computer system configured to perform agent-based network scanning in a software-defined networking (SDN) environment that includes the computer system, a first agent and a second agent, wherein the computer system comprises:
- a processor; and
- a non-transitory computer-readable medium having stored thereon instructions that, when executed by the processor, cause the processor to:
  - identify multiple networks for which network scanning is required, wherein the multiple networks include a first network and a second network, wherein the first network is a first logical overlay network, the second network is a second logical overlay network, and the first network and the second network are different;
  - generate and send a first request to the first agent to cause the first agent to execute a first network mapper (NMAP) utility to obtain first address mapping information associated with multiple first workloads, wherein the first agent and the multiple first workloads, and the first NMAP utility are located in the first network;
  - generate and send a second request to the second agent to cause the second agent to execute a second network mapper (NMAP) utility to obtain second address mapping information associated with multiple second workloads, wherein the second agent and the multiple second workloads, and the second NMAP utility are located in the second network; and
  - aggregate, by and at the computer system, the first address mapping information associated with the first network and the second address mapping information associated with the second network to generate aggregated address mapping information.

14. The computer system of claim 13, wherein the instructions further cause the processor to:
- receive, from the first agent, the first address mapping information specifying hardware address information and network address information associated with each of the multiple first workloads; and
- receive, from the second agent, the second address mapping information specifying hardware address information and network address information associated with each of the multiple second workloads.

15. The computer system of claim 13, wherein the instructions further cause the processor to:
- prior to executing the first NMAP utility and executing the second NMAP utility, receive a request from a network management entity to perform network scanning in the multiple networks; and
- generate and send a response to the network management entity, wherein the response includes the aggregated address mapping information.

16. The computer system of claim 13, wherein the instructions further cause the processor to:
- receive a query identifying hardware address information of a particular workload; and
- based on the aggregated address mapping information, determine network address information associated with the particular workload, wherein the particular workload is one of the multiple first workloads or the multiple second workloads.

17. The computer system of claim 13, wherein
- the first logical overlay network connects the first agent with the multiple first workloads that include first virtualized computing instances; and
- the second logical overlay network connects the second agent with the multiple second workloads that include second virtualized computing instances.

18. The computer system of claim 13, wherein instructions for performing the first network scan and the second network scan cause the processor to:
- receive the first address mapping information via a first secure channel established with the first agent; and
- receive the second address mapping information via a second secure channel established with the second agent.

* * * * *